(12) United States Patent
Schmidt et al.

(10) Patent No.: US 7,537,179 B2
(45) Date of Patent: May 26, 2009

(54) SEAT-BELT RETRACTOR

(75) Inventors: Martin Schmidt, Elmshorn (DE); Stefan Hofs, Bilsen (DE); Thomas Schneider, Husum (DE); Miriam Ors, Sabadell (ES); Santi Gasol, Montmelo (ES); Jordi Casiano, Barbera de Valles (ES)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/963,797

(22) Filed: Dec. 22, 2007

(65) Prior Publication Data
US 2008/0135665 A1    Jun. 12, 2008

Related U.S. Application Data

(63) Continuation of application No. PCT/EP2006/006066, filed on Jun. 23, 2006.

(30) Foreign Application Priority Data

Jun. 24, 2005    (DE) .................. 10 2005 029 487

(51) Int. Cl.
*B60R 22/40* (2006.01)
(52) U.S. Cl. ................. 242/384; 242/384.1; 242/384.2; 242/384.3; 242/384.4
(58) Field of Classification Search ................. 242/381, 242/384, 384.1–384.6; 280/806; 297/478
See application file for complete search history.

(56) References Cited

U.S. PATENT DOCUMENTS

| 3,838,832 | A | * | 10/1974 | Romanzi et al. | ......... 242/384.1 |
| 4,522,350 | A | * | 6/1985 | Ernst | ...................... 242/376.1 |
| 4,757,954 | A | * | 7/1988 | Doty | ...................... 242/384.1 |
| 5,740,980 | A | * | 4/1998 | Ernst | ...................... 242/384.4 |
| 5,791,582 | A | * | 8/1998 | Ernst | ...................... 242/384.4 |
| 6,789,761 | B2 | * | 9/2004 | Glinka | ................... 242/379.1 |

FOREIGN PATENT DOCUMENTS

DE    201 14 710 U1    3/2002
DE    101 43 677 A1    7/2003

* cited by examiner

*Primary Examiner*—Sang Kim
(74) *Attorney, Agent, or Firm*—Brinks Hofer Gilson & Lione

(57) ABSTRACT

In at least one embodiment of the present invention a seat-belt retractor is provided. The seat-belt retractor comprises a locking system that is controlled by means of at least one vehicle-sensitive sensor. The sensor has an alignment mass for autonomous alignment and is configured to pivot on the seat-belt retractor when the angular installation position of the seat-belt retractor is changed and when the seat-belt is extended, the sensor can be fixed in position by a blocking device. The blocking device is friction-controlled by the rotation of the belt shaft in the extension direction. The blocking device includes a rotatably mounted blocking lever which can be displaced into a release position for the sensor by a control lever that is coupled to the belt shaft by a friction coupling when the belt shaft rotates in a retraction direction.

5 Claims, 3 Drawing Sheets

SEAT-BELT RETRACTOR

CROSS REFERENCE TO RELATED APPLICATIONS

This application claims priority to PCT patent application WO 2006/136434 filed Jun. 23, 2006 and DE patent application 10 2005 029 487.1 filed Jun. 24, 2005.

FIELD OF THE INVENTION

The invention relates to a seat-belt retractor for a seat-belt restraint system of a motor vehicle.

BACKGROUND OF THE INVENTION

A seat-belt retractor is described in DE 201 14 710 U1. If a seat-belt retractor of this type is, for example, installed in a vehicle seat where the backrest of the seat can be adjusted at an incline, then an inertial sensor for retractor locking may be provided with an alignment mass that can align itself when the angular position of the belt retractor is changed by adjusting the backrest to a vertical position, so that the response threshold of the sensor remains unchanged with regard to vehicle acceleration or deceleration. Since the sensor aligns and therefore adjusts itself during deceleration from braking, the seat-belt retractor is provided with a blocking device by means of which the sensor is automatically fixed whenever the belt is extended, because it is assumed that the belt will already have been extended early during an accident with a belt shaft rotating in the extension direction. In this type of seat-belt retractor, a two-legged friction spring, one leg of which is displaceably mounted on the seat-belt retractor and the other leg of which fits against a toothing configured on the sensor, is located on a friction disc connected to the belt shaft. The two-legged friction spring serves as a control and blocking device for the sensor mass. When the belt shaft rotates in the extension direction, the friction spring rotates into a position in which its leg fixes the sensor. Upon a reverse rotation of the belt shaft in the retraction direction, the friction spring likewise rotates in reverse with its blocking leg releasing the sensor again.

However, this seat-belt retractor has the disadvantage that fixing the sensor is effective only while the seat-belt extends, whereas the sensor is free for alignment displacement when the belt shaft is stopped.

SUMMARY OF THE INVENTION

It is the object of the invention to ensure, in a seat-belt retractor having the generic features described above, that the sensor is released exclusively when the seat-belt is retracted, since there is no risk of danger to the seat-belted person when the belt is retracted.

In at least one embodiment of the present invention, a blocking device for the sensor consists of a rotatably mounted blocking lever which can be displaced into its release position for the sensor by means of a control lever coupled to the belt shaft by a friction coupling when the belt shaft rotates in the retraction direction. The release of the blocking lever may be arranged for the sensor exclusively when the seat-belt is retracted so that post-alignment of the sensor occurs only while the seat-belt is retracting. For example, when the seat-belt is taken off and also during the usual reverse motion of the seat-belt directly after putting on the seat-belt.

In one example embodiment of the invention, the blocking lever is prestressed in its blocking position, fixing the sensor. This may be advantageous because it may guarantee that the sensor also cannot-move when the belt shaft is at rest and not rotating, but is instead fixed by the blocking lever. To this end, it can be provided that the blocking lever is prestressed by means of a compression spring when in its blocking position.

According to another embodiment of the invention, the friction coupling is configured as a fluid coupling filled with a viscous fluid such that its coefficient of sliding friction is larger than its coefficient of static friction. In one example, the fluid coupling is filled with a silicone material.

Moreover, when the friction coupling is configured such that the coefficient of sliding friction is larger than it coefficient of static friction, the following issue may be resolved when the blocking lever is prestressed in its blocking position. On the one hand, the frictional connection of the control lever with the belt shaft should be configured so large that the control lever can displace the blocking lever into its released position despite the prestress acting against it when the belt shaft rotates in the retraction direction. On the other hand, the friction should be small enough that the set prestress is sufficient to adjust the blocking lever into its blocking position when the belt shaft is still, wherein the control lever should likewise be guided back to its rest position.

Alternatively, it can accordingly be provided that the friction coupling is configured as an eddy-current coupling such that its coefficient of sliding friction is larger than its coefficient of static friction.

In an alternative embodiment in regard to the configuration of the friction coupling, it can be provided that the control lever is pivot-mounted on an extension of the belt shaft and that the friction coupling comprises a friction spring, which is located on the extension of the belt shaft and impinges the blocking lever.

For the connection between the control lever and the blocking lever, it can be provided according to an example embodiment of the invention, that the end of blocking lever opposite the engagement tip demonstrates a bearing surface for the head of the control lever. The bearing surface may be configured in such a manner that pivoting of the control lever causes the blocking lever to rotate.

It can alternatively be provided that the connection between the blocking lever and control lever is configured in the form of a longitudinal-hole connection having a longitudinal hole formed in the blocking lever and a head of the control lever engaging the longitudinal hole.

BRIEF DESCRIPTION OF THE DRAWINGS

Example embodiments of the invention are reflected in the drawing and will be described below. The drawing shows.

DETAILED DESCRIPTION OF THE INVENTION

Figure 1:
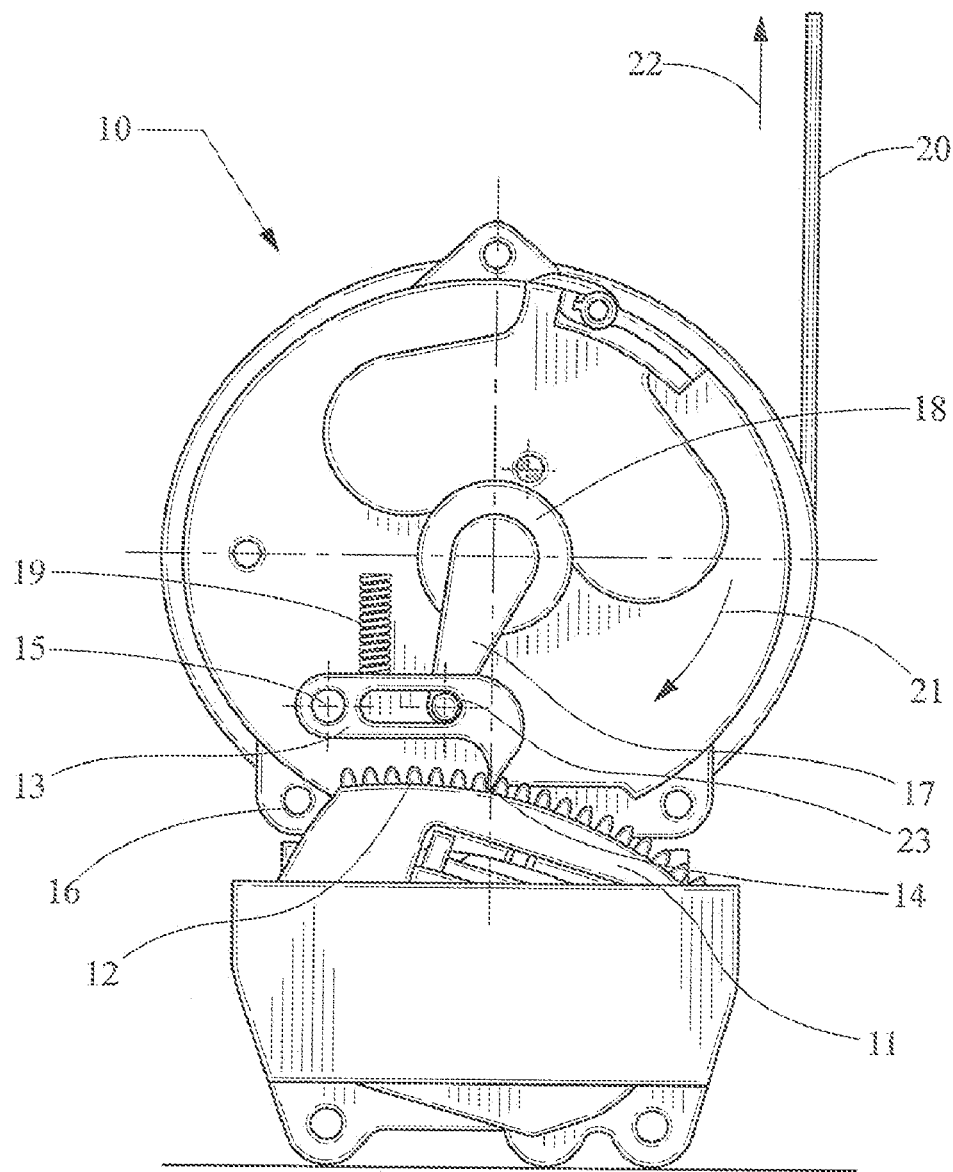
FIG. 1 the system side of a seat-belt retractor in a schematic representation comprising a displaceable sensor and a blocking device in accordance with an embodiment of the present invention.
Figure 2:
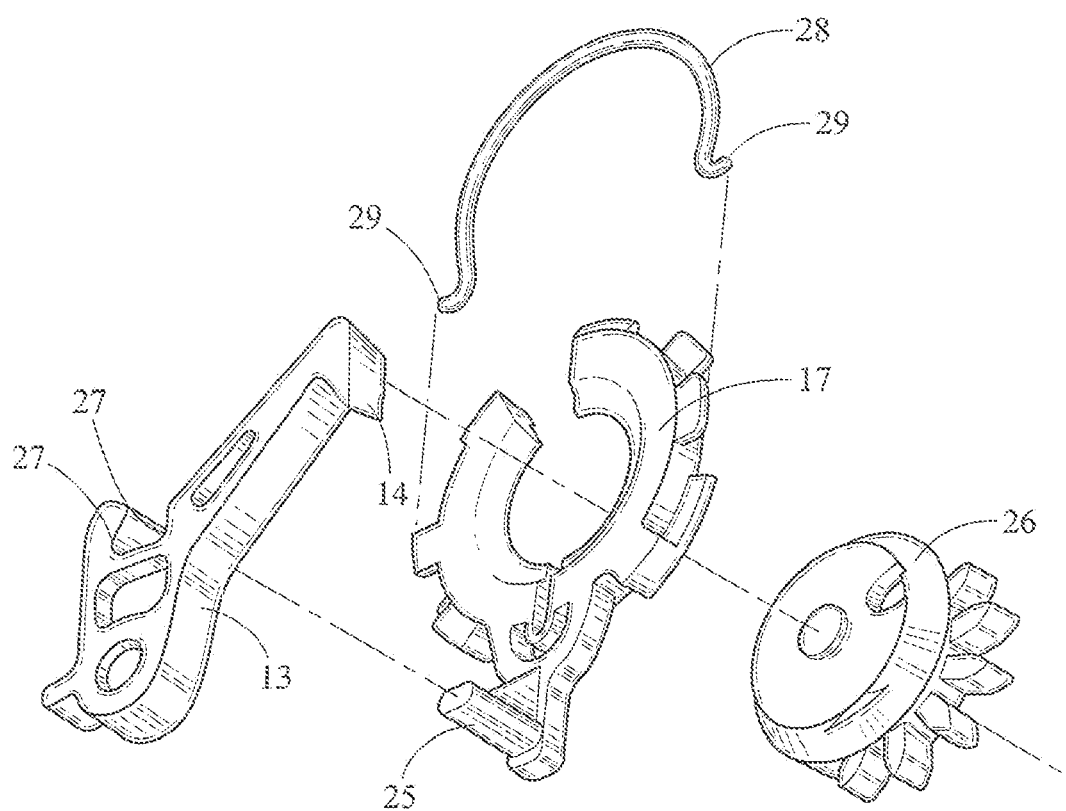
FIG. 2 is an exploded view of a friction coupling configured between the belt shaft and the control lever in accordance with another embodiment of the present invention.
Figure 3:
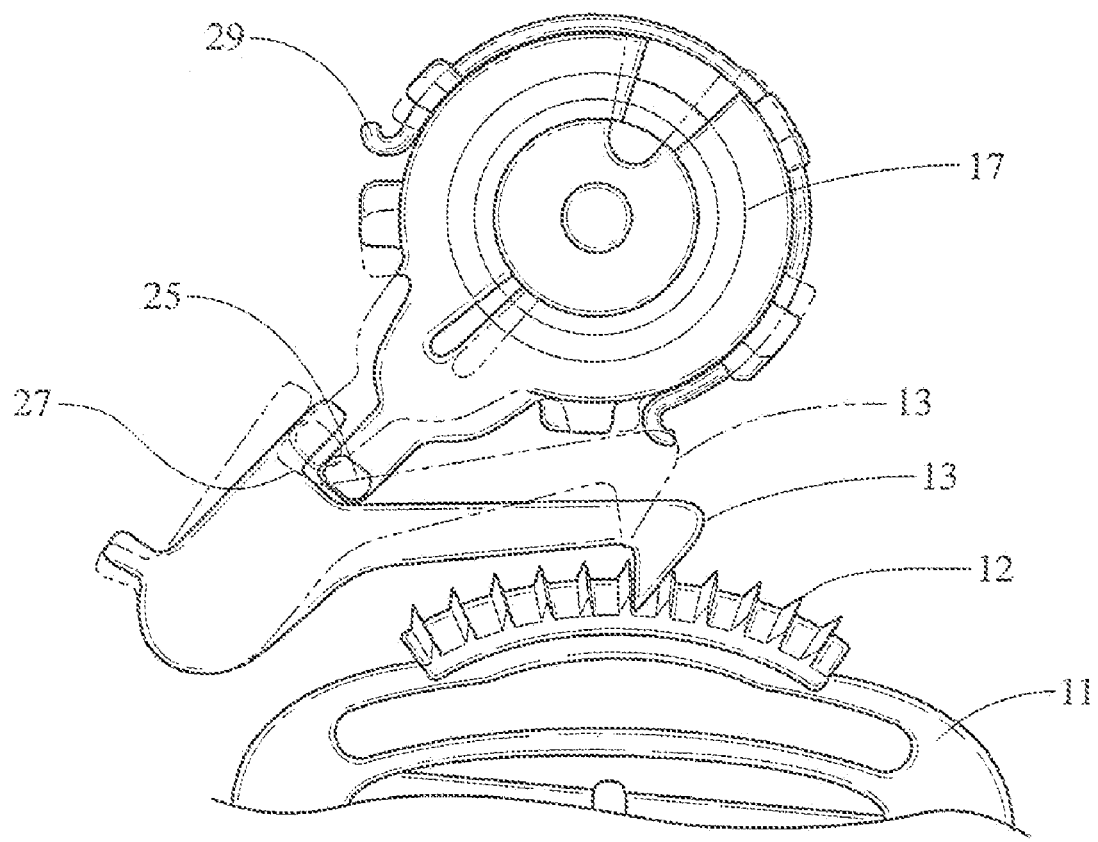
FIG. 3 is a side view of a seat-belt retractor in accordance with another embodiment of the present invention.

Referring now to FIGS. 1 through 3, sensor 11 in the form of a sensor housing is rotatably mounted on the belt retractor 10. The generic DE 201 14 710 U1 explains the construction and function of the sensor 11 in detail and is herein incorporated by reference. To this extent, the features in this connection are also not the subject matter of the present invention. Sensor 11 is an inertial sensing locking device which locks retractor 10 in response to inertial forces. To enable sensor 11 to properly respond to inertial loads while being affixed to a seat which can recline, the sensor is capable of orienting itself and the locking system of this invention will set the position of sensor 11 through a range of seat orientations. Sensor 11 is mounted for pivoting motion under the influence of an alignment mass.

To enable the sensor 11 to be fixed by a blocking lever 13, which is rotatably mounted on the belt retractor 10 around a rotational axis 15, the sensor 11 is provided with a toothing 12 such that the engagement tip 14 of the blocking lever 13 engages the toothing 12 when the blocking lever 13 is in its blocking position. To this end, the blocking lever 13 can pivot between a release position for the sensor 11, wherein the engagement tip 14 is disengaged from the toothing 12, and a blocking position as illustrated in FIG. 1 wherein the engagement tip 14 engages the toothing 12. In the blocking position, the blocking lever 13 may be preloaded or prestressed by a compression spring 19, which is disposed between the blocking lever 13 and belt retractor 10.

A control lever 17, which is coupled to the belt shaft 18, engages the blocking lever 13 by means of a friction coupling, which is not further illustrated, wherein the connection between the control lever 17 and blocking lever 13 is accomplished in the form of a longitudinal-hole connection with a longitudinal hole 16 or slot. The longitudinal hole 16 is formed in the blocking lever 13, providing an opening to allow rotation of the blocking lever 13 between its blocking position and its release position when the control lever 17 rotates.

In another embodiment, the friction coupling between control lever 17 and belt shaft 18 may be configured as a fluid coupling filled with silicone, wherein a coupling part comprising a surface that is connected to the belt shaft 18, while another coupling part comprising an associated surface is connected to the control lever 17. Insofar as a fluid, such as silicone, is present between the reciprocally moving surfaces, the viscosity of the silicone will cause a shear stress when there is relative motion between the two reciprocally moving surfaces, as is yet to be discussed.

As evident from the drawing, the compression spring 19 prestresses the blocking lever 13 urging it into its blocking position with the engagement tip 14 engaging the toothing 12 of the sensor 11. In this position, the sensor 11 and the alignment mass located thereon cannot move, even when vehicle accelerations act upon it. This position of the blocking lever 13 is maintained both when the belt shaft 18 is still and when the belt shaft 18 rotates in the extension direction (arrow 22) as the seat-belt 20 is extended. When the belt shaft 18 rotates in the extension direction, the control lever 17 fits against the end 23 of the longitudinal hole 16 in the blocking lever 13.

If the belt shaft 18 rotates in the retraction direction, (arrow 21), the shear stress generated by the relative motion between the associated coupling surfaces causes the control lever 17 to be pulled in the rotational direction of the belt shaft 18, so that the blocking lever 13 thereby moves out of its engagement with the toothing 12 of the sensor 11 and consequently into its release position against the force of the compression spring 19. In the release position, sensor 11 is free to move into proper orientation. In this respect, the coupling force for moving the control lever 17 is configured larger than the force of the compression spring 19. If the rotation of the belt shaft 18 in the retraction direction is terminated and the belt shaft 18 comes to a stop in this respect, then the coefficient of sliding friction is no longer effective, but the lower coefficient of static friction comes to bear when the fluid coupling is stopped, so that the force of the compression spring 19 can overcome the resistance of the control lever 17 and press the blocking lever 13, including the control lever 17 coupled thereto, back into the blocking position of the blocking lever 13.

In this manner, it is ensured that the alignment of sensor 11 occurs only under safe operating conditions, when the seatbelt retractor 10 is retracting (arrow 21).

In an alternative embodiment of the invention, the friction coupling comprises a friction spring (not shown), which is located on an extension of the belt shaft and impinges the blocking lever. In this example embodiment, it is not necessary for the blocking lever 13 to be prestressed in its blocking position in which it fixes the sensor 11 because the friction spring couples the rotational movement of the blocking lever 13 to the shaft movement.

As evident from FIG. 2, the control lever 17 is rotatably mounted on an extension 26 of the belt shaft 18. A friction spring 28, which is located on the shaft extension 26 and likewise partially surrounds the perimeter of the shaft extension 26 and the bent pulling ends 29 of which engage associated recesses of the control lever 17, is coupled to the control lever 17. The control lever 17 forms a head 25 by means of which the control lever 17 cooperates with the blocking lever 13. In the example embodiments described in regard to FIG. 1, the head 25 can engage the longitudinal hole 16 of the blocking lever 13.

As evident from FIG. 3, which depicts an alternative embodiment having the arrangement of the friction spring, 28, the end of the blocking lever 13 opposite its engagement tip 14 has a bearing surface 27 for the head 25 of the control lever 17. This bearing surface 27 is configured such that pivoting of the control 17 causes the blocking lever 13 to rotate.

In this regard, the solid lines illustrate the release position of the control lever 17 for the toothing 12 of the sensor 11, whereas the dashed lines illustrate the engagement position of blocking lever 13 into the toothing 12. Insofar as the rotational travel of blocking lever 13 is mechanically limited between its engagement position and its release position, the friction spring 28 makes the control lever 17 rotate when the belt shaft or its extension 26 respectively rotates. When the blocking lever 13 impinged by the control lever 17 reaches its respective final stop, the belt shaft and its extension 26 can rotate further within the friction spring 28.

As a person skilled in the art will appreciate, the above description is meant as an illustration of implementation of the principles of this invention. This description is not intended to limit the scope or application of the invention in that the invention is susceptible to modification, variation and change, without departing from, the spirit of this invention, as defined by the following claims.

The invention claimed is:

1. A seat-belt retractor for a seat-belt having a locking system that is controlled by at least one vehicle-sensitive sensor, the vehicle-sensitive sensor of the type having an alignment mass for autonomous alignment and being configured to pivot on the seat-belt retractor when an angular installation position of the seat-belt retractor is changed, comprising a blocking device for fixing the position of the sensor when the seat-belt is extended that is friction-controlled by rotation of a belt shaft in an extension direction of the seatbelt, wherein the blocking device for the sensor includes a rotatably mounted blocking lever that is configured to be displaced from a blocking position which fixes the position of the sensor into a release position for the vehicle-sensitive sensor by a control lever that is coupled to the belt shaft by a friction coupling when the belt shaft rotates in a retraction direction which retracts the seat-belt enabling, the sensor to undergo the autonomous alignment, wherein an end of the blocking lever opposite an engagement tip has a bearing surface for a head formed by the control lever, the bearing surface being configured such that pivoting of the control lever causes the blocking lever to rotate.

2. The seat-belt retractor according to claim 1, wherein the blocking lever is preloaded in a blocking position, fixing the sensor.

3. The seat-belt retractor according to claim 2, wherein the blocking lever is preloaded by a compression spring when in the blocking position.

4. The seat-belt retractor according to claim 1, wherein the control lever is pivot-mounted on an extension of the belt shaft and the friction coupling comprises a friction spring which is located on the extension of the belt shaft and is coupled to the blocking lever.

5. A seat-belt retractor for a seat-belt having a locking system that is controlled by at least one vehicle-sensitive sensor, the vehicle-sensitive sensor of the type having an alignment mass for autonomous alignment and being configured to pivot on the seat-belt retractor when an angular installation position of the seat-belt retractor is changed, comprising a blocking device for fixing the position of the sensor when the seat-belt is extended that is friction-controlled by rotation of a belt shaft in an extension direction of the seat-belt, wherein the blocking device for the sensor include a rotatably mounted blocking lever that is configured to be displaced from a blocking position which fixes the position of the sensor into a release position for the vehicle-sensitive sensor by a control lever that is counted to the belt shaft by a friction coupling when the belt shaft rotates in a retraction direction which retracts the seat-belt, enabling the sensor to undergo the autonomous alignment, wherein a connection between the blocking lever and the control lever is a longitudinal-hole connection having a longitudinal hole formed in the blocking lever and a head formed by the control lever engaging the longitudinal hole.

\* \* \* \* \*